US010712800B2

(12) United States Patent
Tsien et al.

(10) Patent No.: US 10,712,800 B2
(45) Date of Patent: Jul. 14, 2020

(54) ALIGNING ACTIVE AND IDLE PHASES IN A MIXED WORKLOAD COMPUTING PLATFORM

(71) Applicants: Advanced Micro Devices, Inc., Santa Clara, CA (US); ATI Technologies ULC, Markham (CA)

(72) Inventors: Benjamin Tsien, Fremont, CA (US); Alexander J. Branover, Chestnut Hill, MA (US); Ming L. So, Danville, CA (US); Philip Ng, Toronto (CA); Xiao Gang Zheng, Sunnyvale, CA (US); Felix Ho, Toronto (CA); Joseph Scanlon, Sunnyvale, CA (US); Christopher T. Weaver, Boxborough, MA (US); Xiaojie He, Austin, TX (US); Carl Kittredge Wakeland, Scotts Valley, CA (US)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 169 days.

(21) Appl. No.: 15/907,660

(22) Filed: Feb. 28, 2018

(65) Prior Publication Data
US 2019/0265774 A1    Aug. 29, 2019

(51) Int. Cl.
*G06F 1/00* (2006.01)
*G06F 1/3228* (2019.01)
*G06F 1/329* (2019.01)

(52) U.S. Cl.
CPC ............ *G06F 1/3228* (2013.01); *G06F 1/329* (2013.01)

(58) Field of Classification Search
None
See application file for complete search history.

(56) References Cited

U.S. PATENT DOCUMENTS

| 9,971,700 | B2 | 5/2018 | Loh |
| 9,983,652 | B2 | 5/2018 | Piga et al. |
| 2006/0171329 | A1 | 8/2006 | Ying |
| 2008/0126750 | A1 | 5/2008 | Sistla |
| 2009/0177907 | A1* | 7/2009 | Sotomayor, Jr. ...... G06F 1/3203 713/340 |
| 2011/0116427 | A1* | 5/2011 | Chang ............... H04W 52/0216 370/311 |

(Continued)

*Primary Examiner* — Nitin C Patel
(74) *Attorney, Agent, or Firm* — Kowert Hood Munyon Rankin and Goetzel PC; Rory D. Rankin

(57) ABSTRACT

Systems, apparatuses, and methods for aligning active and idle phases of components in a computing system are disclosed. A computing system includes components that can be forced into an active or idle phase and components that cannot be forced into an active or idle phase. The system implements schemes for aligning the active and idle phases of the components within the system. For example, a timer starts counting when a processor and memory subsystem go from a low power state to an operational state. If the amount of time spent by the processor and memory subsystems in the operational state without transitioning to the low power state exceeds a threshold, the system forces active-to-idle and idle-to-active phase transitions of components in the system in order to cause a realignment of active and idle phases of the various components within the system.

20 Claims, 6 Drawing Sheets

(56) References Cited

U.S. PATENT DOCUMENTS

| | | |
|---|---|---|
| 2011/0119526 A1 | 5/2011 | Blumrich et al. |
| 2011/0219208 A1 | 9/2011 | Asaad et al. |
| 2014/0192583 A1 | 7/2014 | Rajan et al. |
| 2015/0120978 A1 | 4/2015 | Kalyanasundharam et al. |
| 2015/0205247 A1* | 7/2015 | Shimizu ................ G03G 15/80 323/212 |
| 2019/0107879 A1* | 4/2019 | Diefenbaugh ........ G06F 1/3234 |
| 2019/0108861 A1 | 4/2019 | Tsien et al. |

* cited by examiner

ALIGNING ACTIVE AND IDLE PHASES IN A MIXED WORKLOAD COMPUTING PLATFORM

BACKGROUND

Description of the Related Art

Computing systems are increasingly integrating large numbers of different types of components on a single chip or on multi-chip modules. The complexity and power consumption of a system increases with the number of different types of components. For example, modern processors typically include a variety of circuits and components to facilitate fast and efficient computation. In addition, circuits and components are included to manage communications between devices, including devices external to the processor. For example, input/output (I/O) controllers are generally included to manage communications with external devices such as display devices, external storage devices, network communications devices, as well as various other peripheral devices. In order to communicate with these devices, transactions are conveyed from, and received by, processing elements of the processor (e.g., central processing units, graphics processing units).

The components in various types of computing systems can include those components which are deemed participating components and those components which are deemed non-participating components. As used herein, a "participating component" or "collaborating component" is defined as a component that cooperates with the other components in aligning active and idle phases. A participating component complies with messages received from a control unit and/or other components. Also, as used herein, a "non-participating component" or "non-collaborating component" is defined as a component that does not cooperate with the other components in aligning active and idle phases. Rather, a non-participating component schedules its own states without regard to the other components or messages sent from the control unit. It is noted that "components" can also be referred to as "devices" herein.

In a computing platform with only participating devices, aligning phases is relatively straightforward. However, in a mixed computing platform with participating and non-participating devices, the non-participating devices can prevent the major components (e.g., processor subsystem, memory subsystem) of the platform from going into a low power state. This results in lost opportunities for power savings.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
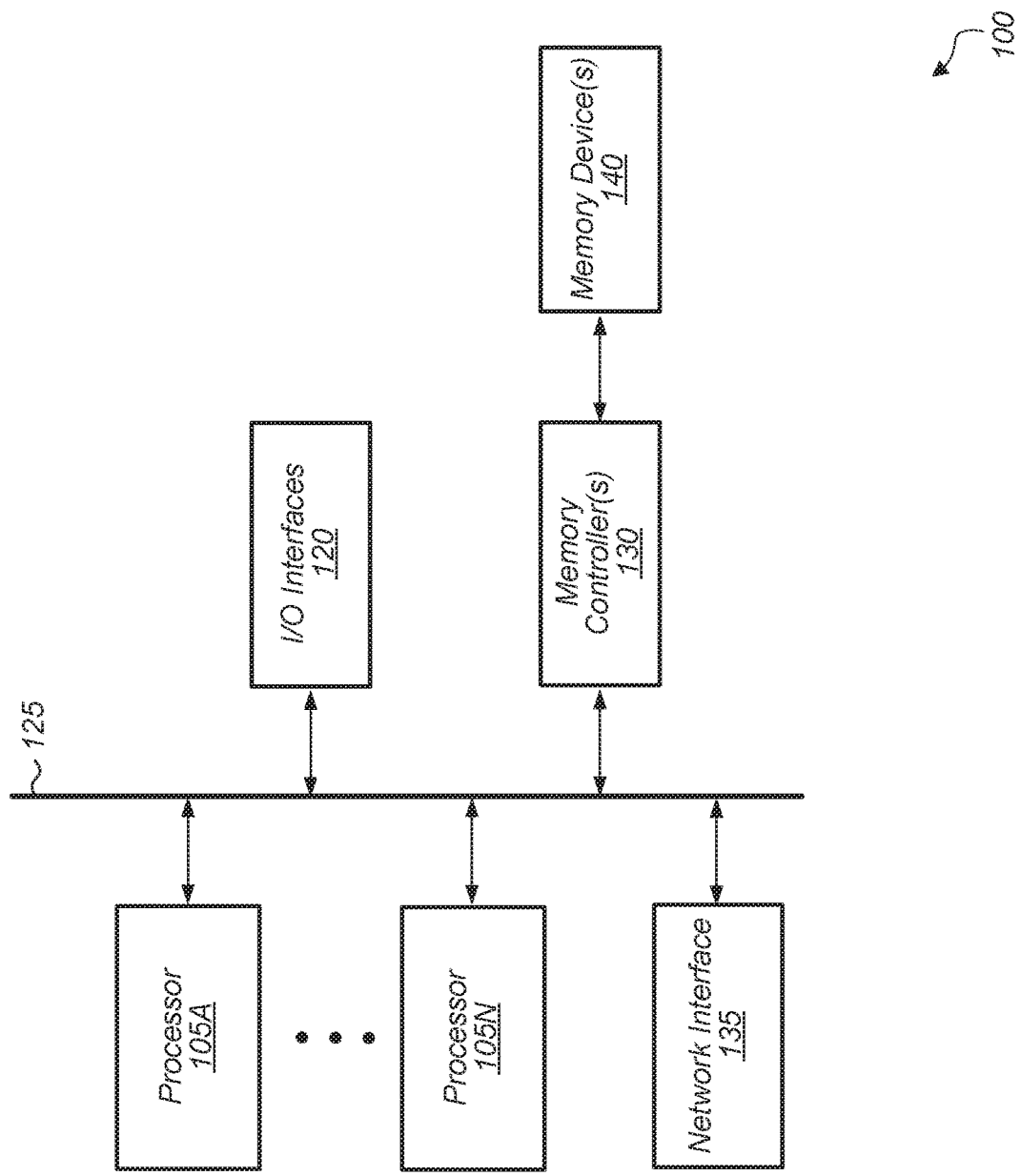
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for aligning active and idle phases for computing platforms are disclosed herein. As used herein, an "active" state refers to a state in which a device is actively performing work (e.g., transferring date, performing computations, etc.) and an idle phase is a state in which the component is not actively performing work. In one embodiment, a system includes at least a processor subsystem, a memory subsystem, and an input/output (I/O) interface. The system can also include any number of peripheral and I/O devices connected to the I/O interface in addition to intellectual property (IP) units integrated within the processor subsystem. On different types of computing systems, the system hardware of peripheral devices, I/O devices, and integrated IP units can collaborate to reduce the total system power by overlapping their direct memory access (DMA) cycles to achieve better memory efficiency on their combined active phase. By combining the active phases of multiple devices, the system combines and extends the existing inactive (idle) states of the devices so that the system can enter and reside longer in a reduced power state. As used herein, a "reduced power state" is defined as a power state in which the computing system consumes less power than the peak power consumption of the system when in the highest operating power state. In one embodiment, a "reduced power state" refers to a power-gated state when one or more subsystems are turned off. In another embodiment, a "reduced power state" refers to a state when one or more components are supplied with a lower than maximum voltage and/or with a lower than maximum clock frequency.

In a mixed workload scenario, one or more devices of the system are deemed to be collaborating devices while one or more devices of the system are deemed to be non-collaborating devices. A collaborating device is a device that works and communicates with other devices to synchronize the active and idle phases of the device. A non-collaborating device is a device that does not collaborate with the other devices to synchronize the active and idle phases of the device. A non-collaborating device schedules its active and idle phases independently of the other devices, without regard to the timing of the other devices' states. When non-collaborating device(s) stay active for an extended period of time, this can cause collaborating devices to become misaligned in state. In some cases, the collaborating devices can become off-state with one another so that they can never recover and find an idle interval to realign their DMA states.

To overcome the challenges of implementing mixed workload computing systems, various techniques can be implemented to mitigate the effects of the non-participating devices. For example, in one embodiment, a control unit utilizes a hysteresis timer to force a realignment of the participating devices when the participating devices have become out of state due to the timing of operations of the non-participating devices. In various embodiments, the hysteresis timer starts counting at a transition of the processor subsystem and memory subsystem from a low power state to an operational state. The hysteresis timer resets if the processor and memory subsystems go back into the low power state. In some embodiments, the hysteresis timer is also reset after a forced state transition. As used herein, an "operational state" refers to a state in which the processor and memory subsystems can do work. While in an operational state, a device may be in an active phase or an idle phase. Conversely, a "low power state" refers to a state in which the processor and memory subsystems can do no work. However, if the processor and memory subsystems stay in the operational state and the hysteresis timer reaches a first threshold (e.g., a threshold amount of time), then the control unit forces an active-to-idle phase transition of the participating devices for a given period of time. In such a case, the participating devices do not actively perform work. After the given period of time has elapsed, the control unit forces an idle-to-active phase transition of the participating devices which allows them to actively perform work and can force them to begin actively fetching data. By forcing these transitions, the hysteresis timer creates an opportunity for the participating devices to align their active and idle phases with each other. Specifically, the idle-to-active phase transition forces all devices to buffer data regardless of whether or not they are at a critical level, causing the devices to become aligned, and thereby creating the desired idle period to allow the processor and memory subsystems to enter the low power state. Generally speaking, forced state transitions do not guarantee realignment success since full knowledge of participating versus non-participating devices in the system is typically not available. Also, it is unknown whether realigning DMA from devices will produce an idle period sufficient for low power transition. However, the hysteresis timer allows the system to continue trying to realign the devices by catching DMA workload transitions in the system.

In another embodiment, the processor subsystem includes one or more non-participating devices or components which are integrated into the processor subsystem. It is noted that there can also be one or more non-participating external devices or components coupled to the processor subsystem via the I/O interface. In this embodiment, the control unit waits for all of the non-participating devices to transition into an idle phase, at which point the control unit forces an active-to-idle phase transition followed by an idle-to-active phase transition for the participating devices or components and any external participating devices which are connected to the I/O interface. In this embodiment, one or more of the integrated or external participating devices might not be in a critical state when the control unit forces the idle-to-active phase transition. However, the participating devices will start buffering when the control unit forces the idle-to-active phase transition regardless of the status of their buffer(s) and/or other local conditions. In another embodiment, each participating device is given its own time slot(s) (e.g., time-weighted arbitration) so that the respective device is allowed to perform a DMA operation during these slot(s) only. In this embodiment, this allows the control unit to regulate overall memory bandwidth.

Referring now to FIG. 1, a block diagram of one embodiment of a computing system 100 is shown. In one embodiment, computing system 100 includes at least processors 105A-N, input/output (I/O) interfaces 120, bus 125, memory controller(s) 130, network interface 135, and memory device(s) 140. In other embodiments, computing system 100 can include other components and/or computing system 100 can be arranged differently. Processors 105A-N are representative of any number of processors which can be included in system 100. It is noted that computing system 100 can also be referred to as a computing platform.

In one embodiment, processor 105A is a general purpose processor, such as a central processing unit (CPU). In this embodiment, processor 105N is a data parallel processor with a highly parallel architecture. Data parallel processors can include graphics processing units (GPUs), digital signal processors (DSPs), field programmable gate arrays (FPGAs), application specific integrated circuits (ASICs), and so forth. In one embodiment, processor 105A and processor 105N are integrated together on a single semiconductor die. In this embodiment, bus 125 and memory controller(s) 130 are also integrated with processors 105A-N on the single semiconductor die. In other embodiments, the arrangement of components of system 100 on semiconductor dies can vary.

Memory controller(s) 130 are representative of any number and type of memory controllers accessible by processors 105A-N and I/O devices (not shown) coupled to I/O interfaces 120. Memory controller(s) 130 are coupled to any number and type of memory devices(s) 140. Memory device(s) 140 are representative of any number and type of memory devices. For example, the type of memory in memory device(s) 140 can include Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various embodiments, computing system 100 can be a computer, laptop, mobile device, game console, server, streaming device, wearable device, or any of various other types of computing systems or devices. It is noted that the number of components of computing system 100 can vary from embodiment to embodiment. For example, there can be more or fewer of each component than the number shown in FIG. 1. It is also noted that computing system 100 can include other components not shown in FIG. 1. Additionally, in other embodiments, computing system 100 can be structured in other ways than shown in FIG. 1.

Figure 2:
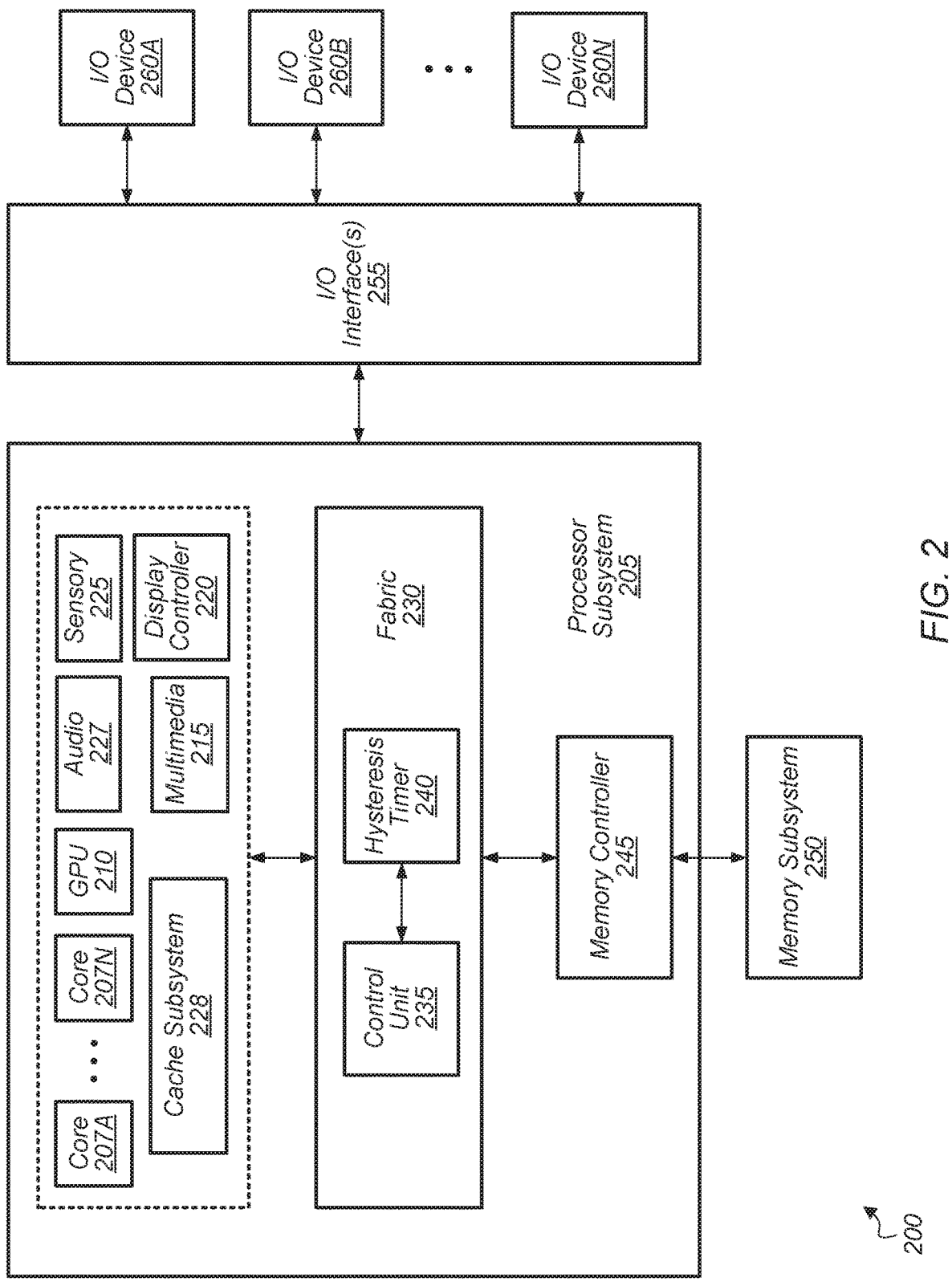
FIG. 2 is a block diagram of another embodiment of a computing system.

Turning now to FIG. 2, a block diagram of another embodiment of a computing system 200 is shown. In one embodiment, computing system 200 includes processor subsystem 205 coupled to memory subsystem 250 and I/O interface(s) 255. I/O interface(s) 255 are coupled to any number and type of I/O devices 260A-N. In one embodiment, computing system 200 is a mixed workload computing system with both participating and non-participating devices. To deal with the loss of alignment of device active and idle DMA states that can occur in a mixed workload computing system, processor subsystem 205 includes control unit 235 and hysteresis timer 240 to periodically force a realignment if the DMA states of the devices of system 200 are out of sync for a threshold amount of time.

In one embodiment, processor subsystem 205 includes a plurality of computing elements. These computing elements can include (but are not limited to) processor cores 207A-N, graphics processing unit (GPU) 210, multimedia engine 215, display controller 220, sensory unit 225, and audio unit 227. Processor cores 207A-N are representative of any number and type of execution units for executing instructions. GPU 210 includes any number of compute units for executing parallel tasks. Any number and type of additional computing elements can also be included in processor subsystem 205. These computing elements are coupled to fabric 230, allowing the computing elements to access memory subsystem 250 via memory controller 245. Processor subsystem 205 also includes cache subsystem 228, which can include any number and levels of caches for storing data and instructions. In one embodiment, the components of processor subsystem 205 are integrated together on a single semiconductor die. It is noted that processor subsystem 205 can also be referred to as an accelerated processing unit (APU).

Fabric 230 is representative of any communication interconnect and any protocol utilized for communicating among the components of the system 200. Fabric 230 provides the data paths, switches, routers, and other logic that connect the processor subsystem 205, I/O interfaces 255, and memory controller 245 to each other. Fabric 230 handles the request, response, and data traffic, as well as probe traffic to facilitate coherency. Fabric 230 also handles interrupt request routing and configuration access paths to the various components of system 200. Additionally, fabric 230 handles configuration requests, responses, and configuration data traffic. Fabric 230 can be bus-based, including shared bus configurations, crossbar configurations, and hierarchical buses with bridges. Fabric 230 can also be packet-based, and can be hierarchical with bridges, crossbar, point-to-point, or other interconnects. From the point of view of fabric 230, the other components of system 200 can be referred to as "clients". Fabric 230 is configured to process requests generated by various clients and pass the requests on to other clients.

Processor subsystem 205 is also coupled to any number and type of I/O devices 260 via I/O interface(s) 255. If the DMA states of I/O devices 260A-N are aligned with the DMA states of the computing elements of processor subsystem 205, this can help allow processor subsystem 205 and memory subsystem 250 to align their idle phases and spend some amount of time in a low-power state. This can help reduce overall power consumption of computing system 200. However, when one or more of the computing elements and/or I/O devices 260 are non-participating devices, then this can cause the DMA states to become out of alignment.

When the DMA states are not aligned, control unit 235 can force an active-to-idle transition followed by an idle-to-active transition in an effort to bring the different devices back in sync with each other. For example, in one embodiment, hysteresis timer 240 starts counting when processor subsystem 205 and memory subsystem 250 go from a low power state to an operational state. If processor subsystem 205 and memory subsystem 250 transition back to the low power state while hysteresis timer 240 is counting, then hysteresis timer 240 is reset. However, if processor subsystem 205 and memory subsystem 250 stay in the operational state and hysteresis timer 240 reaches a programmable threshold, then control unit 235 forces an active-to-idle phase transition for the participating devices and keeps the participating devices in the idle phase for a given duration (i.e., a given period of time). It is noted that in various embodiments, forcing an active-to-idle phase does not necessarily cause the devices to become idle. Rather, the signal conveyed to force the active-to-idle phase serves as a signal to devices to watch for a signal to transition from idle-to-active phase. Then, at the end of the given duration (expiration of the given duration), control unit 235 forces an idle-to-active phase transition for the participating devices. In response to the idle-to-active phase signal, the devices become active (e.g., the devices will begin buffering data even if their buffers have not reached a critical level). In such an embodiment, buffering starts on idle-to-active phase transition or when buffers reach critical level, and stop when a buffer is filled/drained, regardless of the phase. These transitions can help cause the states of the devices of system 200 to realign and allow for processor subsystem 205 and memory subsystem 250 to achieve power savings by periodically going into a low power state. As previously noted, while forcing state transitions does not guarantee that realignment will be achieved, state transitions can be repeated periodically to make additional attempts at realignment.

Figure 3:
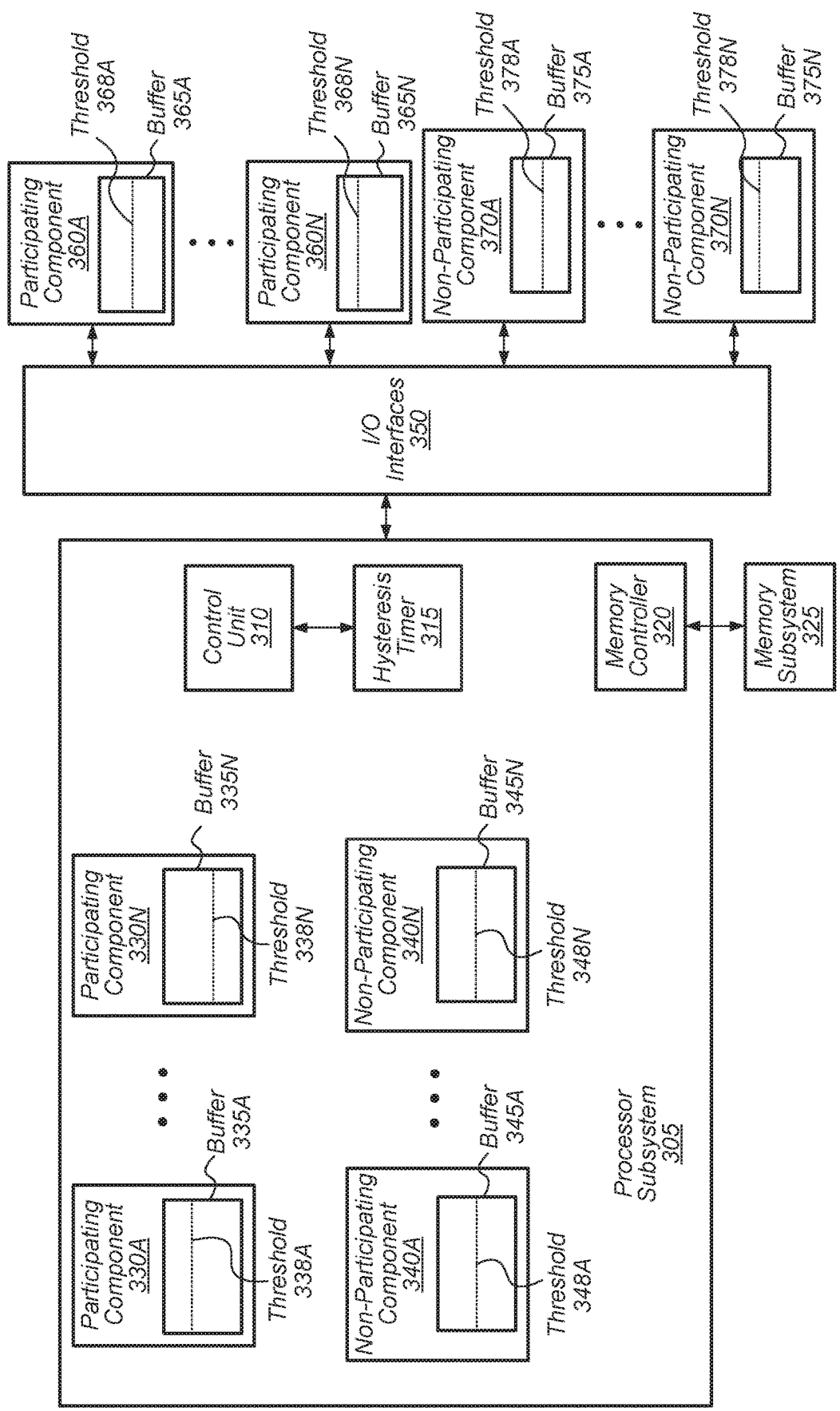
FIG. 3 is a block diagram of another embodiment of a computing system.

Referring now to FIG. 3, a block diagram of another embodiment of a computing system 300 is shown. In one embodiment, computing system 300 includes processor subsystem 305 coupled to memory subsystem 325 and I/O interfaces 350, with I/O interfaces 350 coupled to participating components 360A-N and non-participating components 370A-N. Processor subsystem 305 includes any number and type of participating components 330A-N and non-participating components 340A-N. The participating components 330A-N and non-participating components 340A-N can also be referred to as integrated intellectual property (IP) components or integrated IP units since these components are part of processor subsystem 305. Processor subsystem 305 also includes control unit 310 coupled to hysteresis timer 315 for implementing realignment techniques to help bring about a realignment of the active and idle phases for the various components of system 300 when these components become out of sync. Additionally, processor subsystem 305 includes memory controller 320 for interfacing to memory subsystem 325. Processor subsystem 305 can also include any number of other components (e.g., fabric) which are not shown to avoid obscuring the figure.

Each participating component 330A-N and non-participating component 340A-N includes one or more buffers for buffering data. Each buffer also includes a threshold level of data which is used to determine (at least in part) when the respective component transitions from an idle phase to an active phase. As such, each component has corresponding circuitry that controls a power state of the component. For example, in various embodiments, when a buffer data level reaches a threshold level, the system initiates the fetch or consumption of data in order to avoid an underrun, overflow, or other condition. Additionally, the components can transition from idle to active or active to idle when commanded to do so by control unit 310 to help realign the states of all of the components of system 300. In such an embodiment, the control unit 310 can override the power state or DMA state of a component as determined by its associated circuitry. As shown in FIG. 3, participating component 330A includes buffer 335A, which is representative of any number and size of buffers. Buffer 335A has a corresponding threshold 338A, which can be programmable. In various embodiments, the buffer threshold levels of the components can be programmable or otherwise dynamically alterable based on current operating conditions including factors such as a current data processing rate (e.g., the rate at which data is being consumed from or written into a given buffer), memory bandwidth, system load, or otherwise. Participating component 330A is configured to compare the occupancy level of buffer 335A to threshold 338A and to transition between DMA states based on the comparison. In some embodiments, buffer 335A can back pressure an incoming data stream to lengthen the residency of component 330A in the idle phase.

Similarly, participating component 330N includes buffer 335N with threshold 338N, non-participating component 340A has buffer 345A with threshold 348A, and non-participating component 340N has buffer 345N with threshold 348N. While non-participating components 340A-N transition between states based on the comparison of their respective buffers 345A-N to thresholds 348A-N, non-participating components 340A-N do not comply with the commands sent by control unit 310. This can result in a misalignment among the plurality of components in system 300.

I/O interfaces 350 are representative of any number and type of I/O interfaces for connecting I/O devices to processor subsystem 305 and memory subsystem 325. In one embodiment, I/O interfaces 350 are coupled to participating components 360A-N and non-participating components 370A-N, which are representative of any number and type of components. Each participating component 360A-N has one or more buffers 365A-N with corresponding thresholds 368A-N. Also, each non-participating component 370A-N has one or more buffers 375A-N with corresponding thresholds 378A-N. These components 360A-N and 370A-N coupled to I/O interfaces 350 can transition between active and idle phases based at least on comparisons of their buffer occupancy levels to corresponding thresholds. Additionally, participating components 360A-N can transition between active and idle phases based on commands received from control unit 310. In some embodiments, each of the participating components 330A-N and 360A-N can be masked on or off in different configurations. If a given component is masked off, then control unit 310 does not need to notify this given component in embodiments with point to point notification interfaces. In another embodiment, control unit 310 notifies all of the components but a given masked component can ignore the active-idle messaging from control unit 310.

Figure 4:
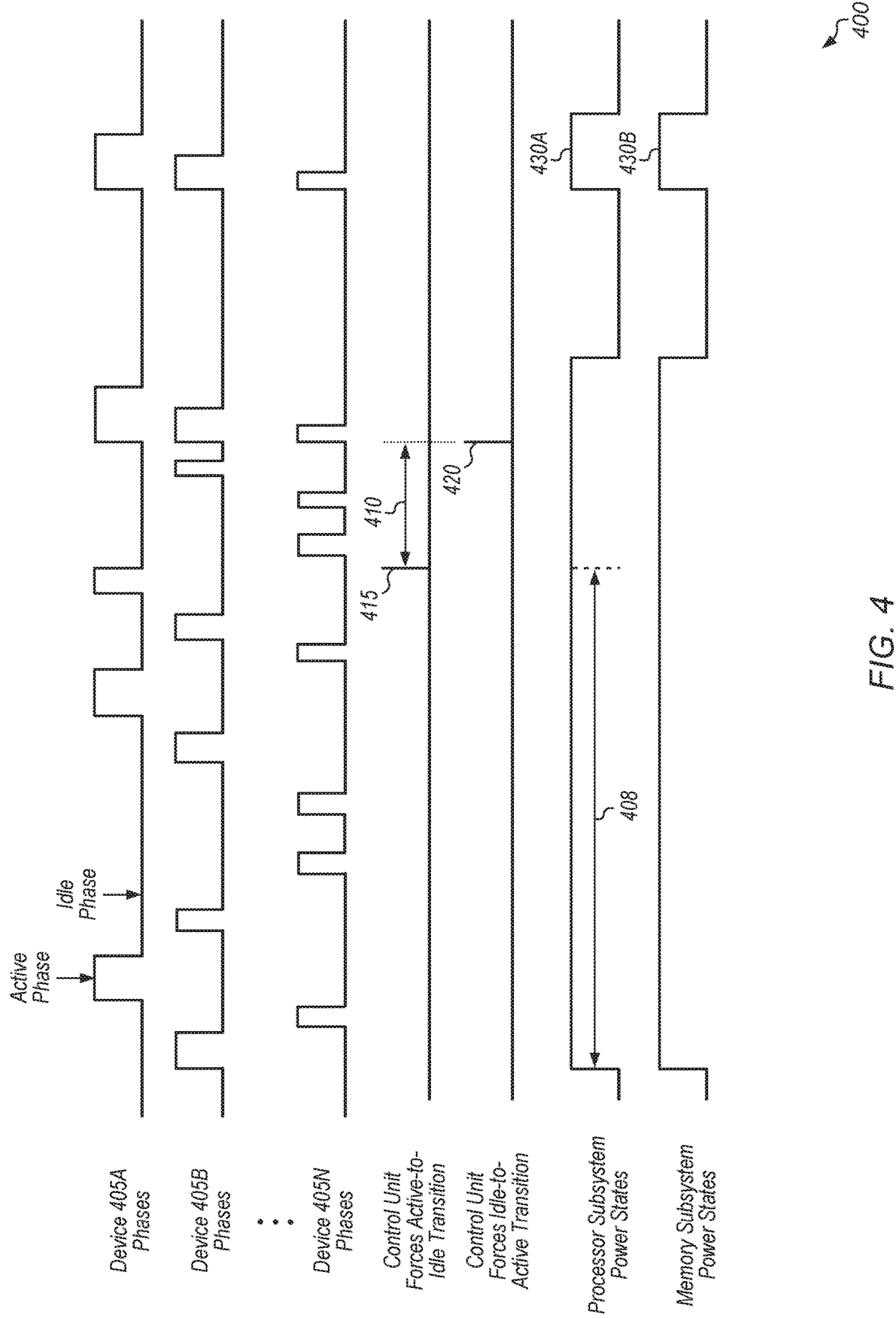
FIG. 4 illustrates one embodiment of a timing diagram of active and idle phases for a mixed workload computing system.

Turning now to FIG. 4, one embodiment of a timing diagram 400 of active and idle phases for a mixed workload computing system is shown. Timing diagram 400 illustrates an example of active and idle phases for various devices and power states of subsystems of a computing system. On the left-side of timing diagram 400, the different labels for the individual rows are listed. For example, the top rows corresponding to devices 405A-N, which are representative of any types of devices which can be included in the host computing system. For each row, the raised portions (i.e., pulses) of the row correspond to periods of time when the device is in an active phase, and the flat portions of the row corresponding to periods of time when the device is in an idle phase. In one embodiment, the active phases shown for devices 405A-N correspond to DMA states. In other embodiments, the active phases shown for devices 405A-N can correspond to other types of activities. The bottom rows of timing diagram 400 show the power states of the processor subsystem and the memory subsystem. A raised portion of a row for the processor or memory subsystem indicates the subsystem is in an operational state while a flat portion indicates the subsystem is in a low-power state.

Starting on the left-side of timing diagram 400 for the rows showing the states of devices 405A-N, it can be seen that the phases of these devices 405A-N are out of sync with each other. This results in devices 405A-N utilizing the processor and memory subsystems at different times, preventing the processor and memory subsystems from going into low power states. This causes increased power consumption for the computing system. This drift into misalignment can be caused by non-participating devices which schedule their active and idle phases independently from the participating devices, which can result in the participating devices becoming out of sync.

In one embodiment, a control unit monitors the amount of uninterrupted time the processor subsystem and/or memory subsystem spend in an operational state without transitioning to a low-power state. When the amount of uninterrupted time exceeds a threshold, then the control unit sends signals to the participating devices to force an active-to-idle phase transition. The duration 408 illustrates the amount of uninterrupted time exceeding the threshold, and pulse 415 illustrates the control unit forcing the active-to-idle phase transition. Forcing an active-to-idle phase transition does not necessarily force the devices to stop buffering since the devices make requests based on their buffer levels.

After the duration 410, the control unit forces an idle-to-active phase transition for the participating devices. This is shown as pulse 420 in timing diagram 400. As a result, the devices will go active regardless of whether or not they are at a critical level or not. As used herein, the term "critical" when referring to a buffer level or status of a device is defined as detecting that the amount of data in the buffer(s) of the device has reached its threshold limit. Depending on whether the device is a consumer or producer of data, the threshold can be reached when the amount of data of the buffer(s) rises above the threshold or falls below the threshold. Also, the term "non-critical buffer status" refers to a scenario where the amount of data in the device's buffer(s) has not reached the threshold limit. During the period of time following the idle-to-active phase transition 420, the processor and memory subsystems can service requests from the devices 405A-N. After going active, the processor and memory subsystems can go into a low-power state again and then return to an operational state at a later point in time when some device resumes buffering and forces a power-up, as shown by pulses 430A-B, to service requests from devices 405A-N. In another embodiment, the transitions from active to idle and idle to active can be initiated by a given device 405. For example, a given device 405 can detect an urgent or near-error condition that requires the given device 405 to override the control unit time-based directive. Accordingly, the control unit can receive a notification from the given device 405 and broadcast the notification (i.e., signal an idle-to-active phase transition) to the other devices 405A-N to align them in the idle-to-active transition.

It is noted that the memory subsystem (e.g., memory subsystem 325 of FIG. 3) is typically a high-bandwidth subsystem and can service a large amount of requests from multiple devices concurrently in a short period of time. This allows the memory subsystem to be active for a short period of time (shown as 430B) and service multiple devices 405A-N and then go idle for the period of time after 430B.

Typically, after the control unit forces the realignment with transitions 415 and 420, the devices 405A-N will be able to get back into alignment with each other.

Figure 5:
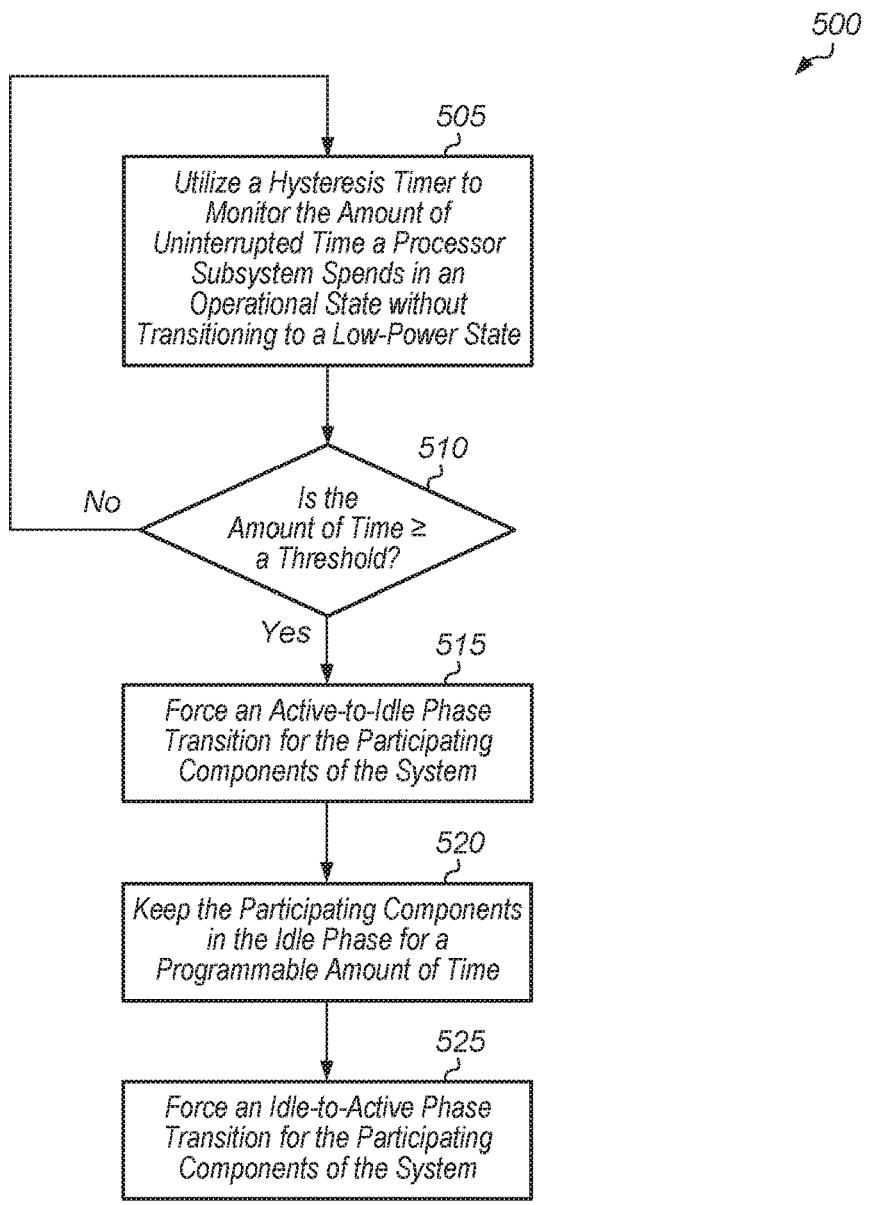
FIG. 5 is a generalized flow diagram illustrating one embodiment of a method for realigning the active and idle phases of a mixed workload computing platform.
Figure 6:
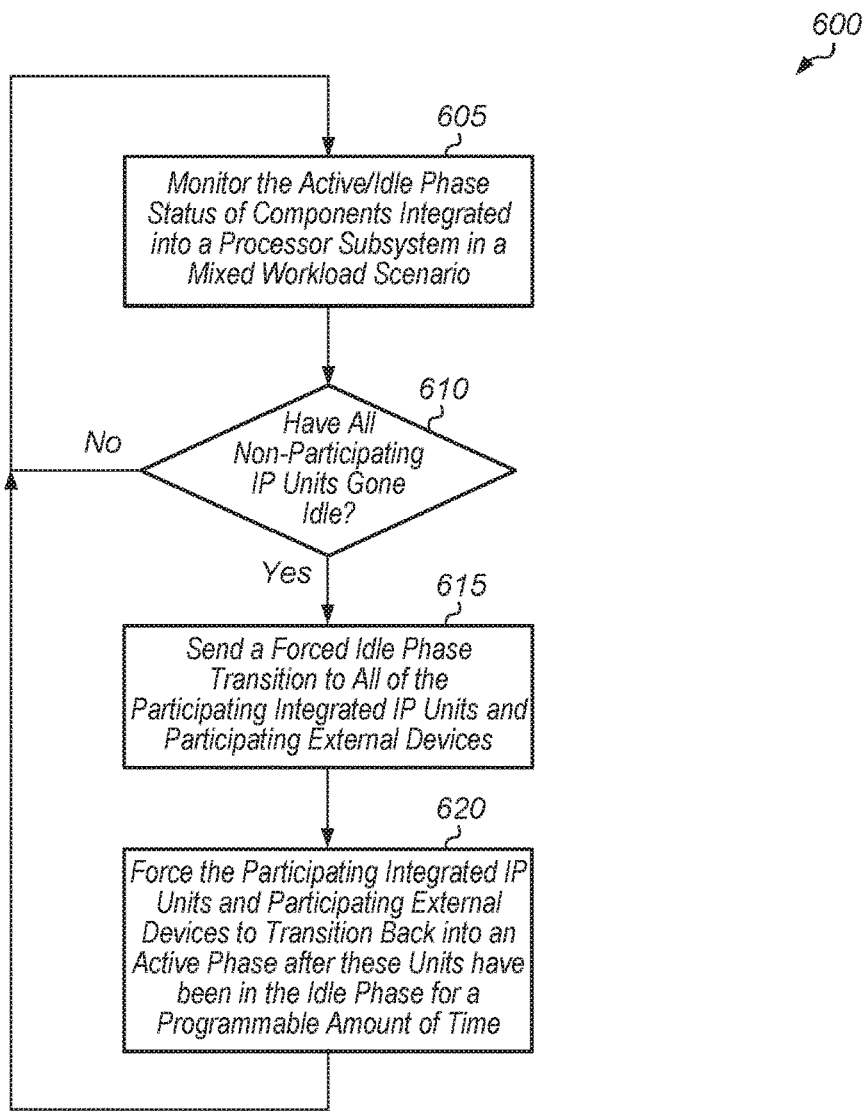
FIG. 6 is a generalized flow diagram illustrating one embodiment of a method for aligning integrated IP units in an APU.

Referring now to FIG. 5, one embodiment of a method 500 for realigning the active and idle phases of a mixed workload computing platform is shown. For purposes of discussion, the steps in this embodiment and those of FIG. 6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A control unit utilizes a hysteresis timer to monitor the amount of uninterrupted time a processor subsystem spends in an operational state without transitioning to a low-power state (block 505). In one embodiment, the control unit, hysteresis timer, processor subsystem, and a memory subsystem are part of a computing system. The computing system also includes any number of other components, some of which are participating and some of which are non-participating in the active and idle phase coordination scheme. In one embodiment, the control unit first performs a check to determine if the memory subsystem is already bandwidth constrained prior to utilizing the hysteresis timer. If the memory subsystem is not bandwidth constrained, then the control unit can use the hysteresis timer. Otherwise, if the memory subsystem is already bandwidth constrained, it might not be beneficial to force a DMA state realignment, and so the control unit can forgo use of the hysteresis timer.

If the amount of time the processor subsystem spends in the operational state without transitioning to the low-power state, or the amount of time since the last realignment is greater than or equal to a threshold amount of time (conditional block 510, "yes" leg), then the control unit forces an active-to-idle phase transition for the participating components of the system (block 515). The value of the threshold can vary from embodiment to embodiment. For example, in a first embodiment, the threshold can be one second. In another embodiment, the threshold can be 100 milliseconds. In other embodiments, the threshold can be any of various other values. As used herein, the term "force" is defined as causing a component to enter a given state even if the local conditions (e.g., buffer occupancy) of the component dictate otherwise. For example, in one embodiment, in block 525, the control unit "forces" a component to start DMA operations regardless of its buffer state. If the amount of uninterrupted time the processor subsystem spends in the operational state without transitioning to the low-power state is less than the threshold (conditional block 510, "no" leg), then method 500 returns to block 505.

After block 515, the control unit keeps the various participating components in the idle phase for a programmable amount of time (block 520). In one embodiment, the programmable amount of time ensures that the transition from active to idle and then back to active is not lost due to clock domain crossing. Then, after the participating components are in the idle phase for the programmable amount of time, the control unit forces an idle-to-active phase transition for the participating components of the system (block 525). In one embodiment, the control unit forces an idle-to-active phase transition by scheduling DMA states for each participating component in a corresponding time slot. In this embodiment, each component is allowed to perform DMA operations only during their assigned slot(s). After block 525, method 500 ends. As a result of implementing method 500, it is likely that the participating components will be able to realign their states with one another. If the participating components are still out of sync after implementing method 500, method 500 can be implemented at a later point in time to make another realignment attempt.

Turning now to FIG. 6, one embodiment of a method 600 for aligning integrated intellectual property (IP) units in an accelerated processing unit (APU) is shown. A control unit monitors the active/idle phase status of components integrated into a processor subsystem in a mixed workload scenario (block 605). For the purposes of this discussion, it is assumed that in the mixed workload scenario, the processor subsystem includes participating integrated IP units and non-participating integrated IP units. The computing platform can also include any number of participating and non-participating external devices. While monitoring the active/idle phase status of the processor subsystem components, the control unit determines if all of the non-participating integrated IP units have transitioned into an idle phase (conditional block 610).

If all of the non-participating integrated IP units have transitioned into an idle phase (conditional block 610, "yes" leg), then the control unit forces a transition to the idle phase for all of the participating integrated IP units and participating external devices (block 615). After the participating integrated IP units and participating external devices have been in the idle phase for a programmable amount of time, the control unit forces these participating integrated IP units and participating external devices to transition back into an active phase (block 620). It is noted that by forcing the transition back into the active phase, these participating integrated IP units and participating external devices will start buffering data even if their buffers are not at a critical level. After block 620, method 600 returns to block 605. If one or more of the non-participating integrated IP units are still in an active phase (conditional block 610, "no" leg), then method 600 returns to block 605. It is noted that in some embodiments, methods 500 and 600 can be performed together for the same computing system.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (HDL) such as Vetilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
a memory subsystem;
a processor subsystem coupled to the memory subsystem, wherein the processor subsystem comprises a plurality of components; and
a control unit configured to:
monitor an amount of time that each of the processor subsystem and the memory subsystem spend in an operational state without transitioning to a low-power state, said operational state including at least an active phase and an idle phase; and
responsive to detecting that the amount of time is greater than a first duration:
force a transition of at least a first subset of components into the idle phase for a second duration; and
force a transition of the first subset of components into the active phase after expiration of the second duration.

2. The system as recited in claim 1, wherein each of the plurality of components is configured to control its own active and idle phases and the control unit is configured to override active and idle phase determinations made by the plurality of components.

3. The system as recited in claim 1, wherein at least one component of the first subset of components has a non-critical buffer status when the control unit forces the transition of the first subset of components into the active phase.

4. The system as recited in claim 1, wherein:
the system comprises a second subset of components different from the first subset of components that correspond to non-participating components that do not comply with state transition commands from the control unit; and
the control unit is further configured to force the transition of at least the first subset of components into the idle phase for the second duration, responsive to detecting each of the non-participating components transitions into an idle phase.

5. The system as recited in claim 4, wherein the control unit is configured to start a timer on a transition of the processor subsystem and the memory subsystem from the low-power state to the operational state.

6. The system as recited in claim 1, wherein the first subset of components correspond to participating components that comply with state transition commands from the control unit.

7. The system as recited in claim 1, wherein:
the system comprises a second subset of components different from the first subset of components that correspond to non-participating components that do not comply with state transition commands from the control unit; and
in an active phase, the non-participating components can cause participating components to become misaligned in state.

8. A method comprising:
monitoring, by a control unit, an amount of time that each of a processor subsystem and a memory subsystem spend in an operational state without transitioning to a low-power state, said operational state including at least an active phase and an idle phase;
responsive to detecting that the amount of time is greater than a first duration:
force a transition of at least a first subset of components into the idle phase for a second duration; and
force a transition of the first subset of components into the active phase after expiration of the second duration.

9. The method as recited in claim 8, further comprising each of the plurality of components controlling its own active and idle phases and the control unit is configured to override active and idle phase determinations made by the plurality of components.

10. The method as recited in claim 8, wherein at least one component of the first subset of components still has a non-critical buffer status when the control unit forces the transition of the first subset of components into the active phase.

11. The method as recited in claim 8, wherein:
the system comprises a second subset of components different from the first subset of components that correspond to non-participating components that do not comply with state transition commands from the control unit; and
the method further comprises forcing the transition of at least the first subset of components into the idle phase for the second duration, responsive to detecting each of the non-participating components transitions into an idle phase.

12. The method as recited in claim 11, further comprising starting a timer on a transition of the processor subsystem and the memory subsystem from the low-power state to the operational state.

13. The method as recited in claim 8, wherein the first subset of components correspond to participating components that comply with state transition commands from the control unit.

14. The method as recited in claim 13, wherein:
a second subset of components correspond to non-participating components that do not comply with state transition commands from the control unit; and
in an active phase, the non-participating components can cause participating devices to become misaligned in state.

15. An apparatus comprising:
a plurality of components;
a communication fabric; and
a control unit;
wherein the control unit is configured to:
monitor an amount of time that the apparatus spends in an operational state without transitioning to a low-power state, said operational state including at least an active phase and an idle phase; and
responsive to detecting that the amount of time is greater than a first duration:
force a transition of at least a first subset of components into the idle phase for a second duration; and
force a transition of the first subset of components into the active phase after expiration of the second duration.

16. The apparatus as recited in claim 15, wherein each of the plurality of components is configured to control its own active and idle phases and the control unit is configured to override active and idle phase determinations made by the plurality of components.

17. The apparatus as recited in claim 15, wherein at least one component of the first subset of components still has a non-critical buffer status when the control unit forces the transition of the first subset of components into the active phase.

18. The apparatus as recited in claim 15, wherein:
the system comprises a second subset of components different from the first subset of components that correspond to non-participating components that do not comply with state transition commands from the control unit; and
the control unit is further configured to force the transition of at least the first subset of components into the idle phase for the second duration, responsive to detecting each of the non-participating components transitions into an idle phase.

19. The apparatus as recited in claim 18, wherein the control unit is configured to start a timer on a transition of the apparatus from the low-power state to the operational state.

20. The apparatus as recited in claim 15, wherein the first subset of components correspond to participating components that comply with state transition commands from the control unit.

* * * * *